United States Patent [19]

Kitagawa

[11] Patent Number: 5,172,725
[45] Date of Patent: Dec. 22, 1992

[54] DEVICE FOR SWITCHING THE FLOW DIRECTION OF FLUID

[76] Inventor: Isao Kitagawa, 110-4, Kamiwada-cho, Takasaki-shi, Gumma-ken, Japan

[21] Appl. No.: 822,445

[22] Filed: Jan. 17, 1992

[51] Int. Cl.$^5$ .................. F16K 11/085; F16K 11/087
[52] U.S. Cl. ............................................. 137/625.43
[58] Field of Search ...................... 137/625.29, 625.43, 137/311

[56] References Cited

U.S. PATENT DOCUMENTS

| | | | |
|---|---|---|---|
| 3,973,592 | 8/1976 | Cleaver et al. | 137/625.43 |
| 4,543,996 | 10/1985 | Baron | 137/625.43 |
| 4,738,265 | 4/1988 | Ritchart et al. | 137/625.43 X |
| 4,774,977 | 10/1988 | Cohen | 137/625.43 |

FOREIGN PATENT DOCUMENTS 2-110770  9/1990  Japan.
481685  3/1938  United Kingdom ........... 137/625.43

*Primary Examiner*—Stephen M. Hepperle
*Attorney, Agent, or Firm*—Basile and Hanlon

[57] ABSTRACT

A device for switching the flow direction of a fluid includes a main body having an inlet to be connected with a fluid supply source and an exit to be connected with a fluid flow destination, each disposed on the primary side of the main body, and a first exit/inlet and a second exit/inlet to be connected with an apparatus using the fluid, each disposed on the secondary side of the main body. The device further includes a selector rotatably disposed in the main body around a rotational shaft. The selector has a plurality of flow channels or spaces each partitioned by a partition plate of a thickness smaller than the diameter of each of the ports of the main body so that the inlet and the exit can be selectively in communication with the first exit/inlet and the second exit/inlet respectively during rotation of the selector. Neither a large load is exerted on the pump nor a large pressure is applied on the fluid using apparatus upon switching the fluid flow direction so as to make the device firm and simplified in the structure.

2 Claims, 9 Drawing Sheets

FIG. 4
(a)
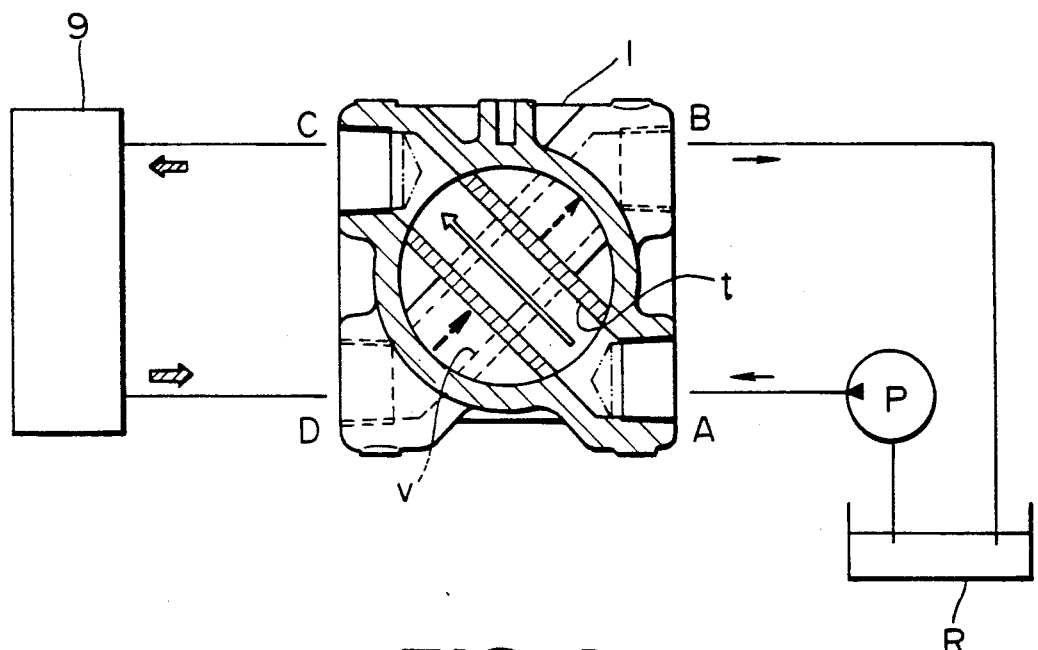
(b)
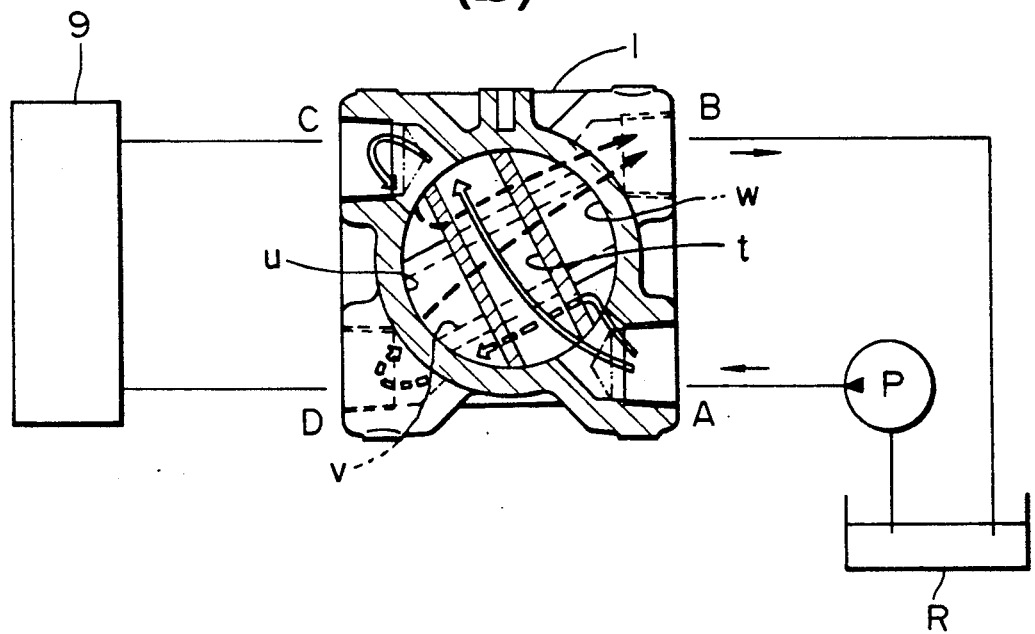

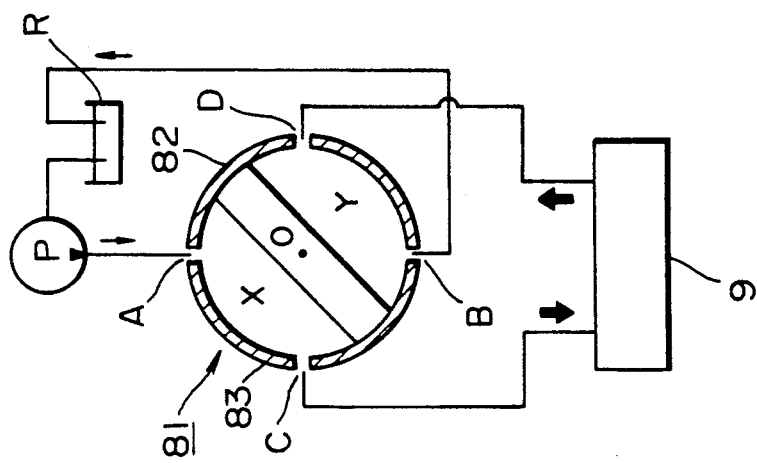
PRIOR ART FIG. 8(c)
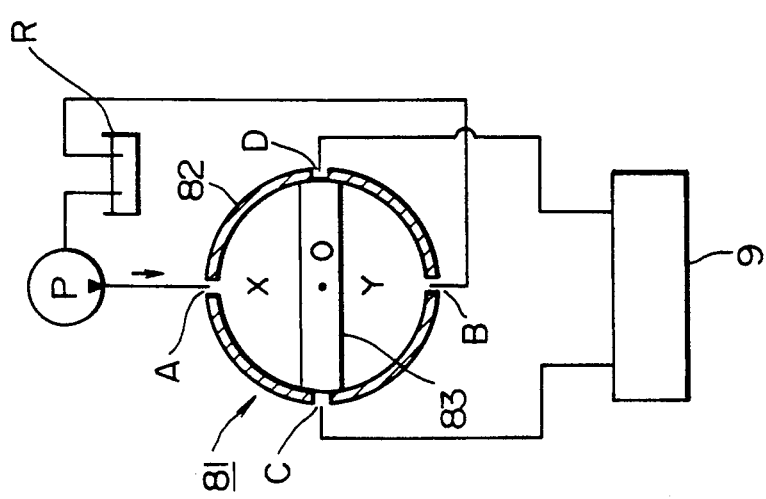
PRIOR ART FIG. 8(b)
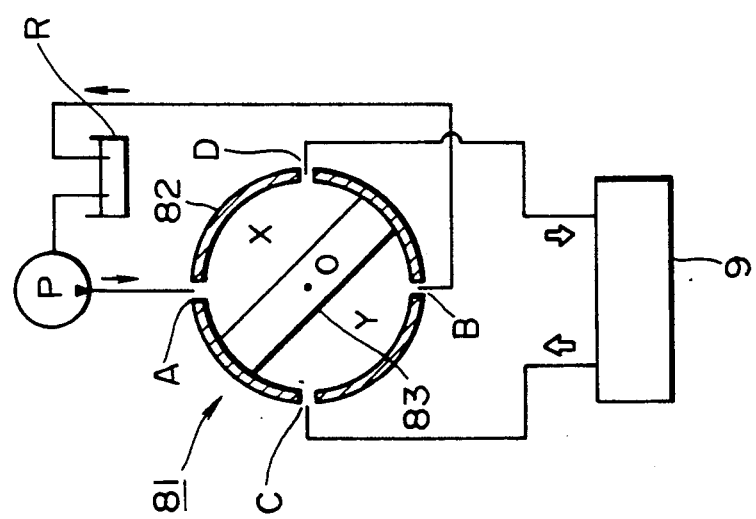
PRIOR ART FIG. 8(a)

DEVICE FOR SWITCHING THE FLOW DIRECTION OF FLUID

BACKGROUND OF THE INVENTION

1. Field of the Invention

The present invention concerns a device for switching the flow direction of a fluid which is connected to equipment using the fluid and having a fluid circulating path disposed at the inside thereof and used for switching the flow direction in the circulating path between the forward direction and the backward direction.

2. Description of the Prior Art

Existent rotary directional control valves have a structure, for example, as shown in FIGS. 8(a)–8(c) in which a directional control valve 81 has a partition plate 83 rotatably disposed in a cylinder 82 of a cylindrical shape. A first flow space X and a second flow space Y are formed on both sides of the partition plate 83. An inlet A on the primary side, a first exit/inlet C on the secondary side, an exit B on the primary side, and a second exit/inlet D on the secondary side are opened to the circumferential side of the cylinder 82 each at an angle of 90° from each other. The inlet A on the primary side is connected to a fluid supply source, such as a pump P, and the exit B is connected to a flow destination of a fluid, such as a reservoir tank R. On the other hand, both of the exits/inlets C and D on the secondary side are connected to both ends of a circulating path of an equipment 9 using the fluid.

Then, when the control valve 81 is in a state shown in FIG. 8(a), since the first flow space X communicates the inlet A with the second exit/inlet D, and the second flow space Y communicates the exit B with the first exit/inlet C, the fluid flows to the equipment 9 on the secondary side in the direction indicated by the arrows shown in FIG. 8(a) (hereinafter referred to as a forward direction). then, when the control valve 81 turns to a state shown in FIG. 8(b), since the partition plate 83 closes the first and the second exits/inlets C and D, the fluid does not flow on the secondary side. Further, when the control valve 81 is in a state shown in FIG. 8(c), since the first flow space X communicates the inlet A with the first exit/inlet C, and the second flow space Y communicates the exit B with the second exit/inlet D, the fluid flows to the equipment 9 on the secondary side in the direction indicated by the arrows shown in FIG. 8(c) (hereinafter referred to as a backward direction).

Thus, the directional control valve 81 has a structure which is capable of switching the fluid flow direction on the secondary side between the forward and the backward directions by rotating the partition plate 83, without changing the fluid flowing direction on the primary side.

In the existent directional control valve 81 as described above, however, when the flow of the fluid on the secondary side is stopped with the ends of the partition plate 83 being placed on the first exit/inlet C and the second exit/inlet D or on the inlet A and the exit B, the partition plate 83 closes the flow ports so that no more fluid flows in the flow channel. Accordingly, in this stationary state, a load is wastefully exerted on the pump P that delivers the fluid in one direction and results in a concern that the pump may fail if such a state is left as it is for a long period of time.

Particularly, in a state where the partition plate 83 closes the first exit/inlet C and the second exit/inlet D, as shown in FIG. 8(b), the fluid pressure in the first flow space X in communication with the inlet A is increased which exerts a large load on the partition plate 83. This brings about a problem of deterioration of the endurance of the device, for example, by creating slack in the attaching portion of a rotational shaft.

SUMMARY OF THE INVENTION

It is, accordingly, an object of the present invention to overcome the foregoing problems in the prior art and to provide a device for switching the flow direction of a fluid which can prevent an excessively large load on a pump upon switching the flow direction of the fluid and which is highly resistant to destruction and is excellent in durability.

The foregoing object can be attained in accordance with the first embodiment of the present invention by a device for switching the flow direction of a fluid in which the device includes a main body having an inlet to be connected with a fluid supply source and an exit to be connected with a flow destination of the fluid, each disposed on the primary side of the main body, and a first exit/inlet and a second exit/inlet to be connected with an apparatus using the fluid, each disposed on the secondary side of the main body. The device further includes a selector rotatably disposed in the main body rotatably around a rotational shaft. The selector has a first flow channel capable of communicating the inlet with the first exit/inlet, a second flow channel capable of communicating the inlet with the second exit/inlet, or the exit with the first exit/inlet, a third flow channel capable of communicating the exit with the second exit/inlet and a fourth flow channel capable of communicating the exit with the first exit/inlet, or the inlet with the first exit/inlet.

The inlet, the exit, the first exit/inlet and the second exit/inlet are disposed at such positions that communication of the first flow channel and the third flow channel or communication of the second flow channel and the fourth flow channel are attained simultaneously along with the rotation of the selector.

Each of the flow channels is partitioned with a partition plate having a thickness smaller than the diameter of each of the inlet, the exit and the exits/inlets.

The foregoing object can also be attained in accordance with a second embodiment of the present invention by a device for switching the flow direction of a fluid comprising a main body having an inlet to be connected with a fluid supply source and an exit to be connected with a flow destination of the fluid, each disposed on the primary side of the main body, and a first exit/inlet and a second exit/inlet to be connected with an apparatus using the fluid, each disposed on the secondary side of the main body. The device further includes a selector rotatably disposed in the main body around a rotational shaft. The selector has a first flow space capable of communicating one of the inlet and the exit with one of the first exit/inlet and the second exit/inlet, a second flow space capable of communicating the other of the inlet and the exit with the other of the first exit/inlet and the second exit/inlet, in which both of the flow spaces are symmetrical to each other with respect to the rotational shaft, and both of the flow spaces are partitioned by a partition plate having a thickness smaller than the diameter of each of the inlet, the exit and the exits/inlets.

In the first embodiment of the present invention in which four flow channels are formed by the selector, when the selector is rotated by 90° around its rotational axis as the center from a state in which the inlet is in communication by way of the first flow channel with the first exit/inlet and the exit is in communication by way of the third flow channel with the second flow channel, the inlet is then in communication by way of one of the second flow channel and the fourth flow channel with the second exit/inlet and the exit is then in communication by way of the other of the fourth flow channel and the second flow channel with the first exit/inlet. Accordingly, the flow direction of the fluid flowing through the flow channel in the equipment using the fluid on the secondary side is reversed by the switching of the selector.

In another embodiment of the present invention in which two flow spaces are formed in the selector, when the selector is rotated 90° around its rotational axis as the center from the state in which the inlet is in communication by way of one of the first and the second flow spaces with the first exit/inlet and the exit is in communication by way of the other of the first flow space and the second flow space with the second exit/inlet, the inlet is then in communication by way of the other flow space with the second exit/inlet, while the exit is not in communication by way of one of the flow spaces with the first exit/inlet. Accordingly, the flow direction of the fluid flowing through the flow channel of the equipment using the fluid on the secondary side is reversed by switching the selector in the manner similar to that in the first embodiment.

Further, in both of the embodiments described above, when the selector is rotated with the ends of the partition plate being placed on each of the ports, the primary side is in communication with the secondary side through the gap between the thin partition plate and each of the ports and fluid pressures are exerted in both of the forward and backward directions on the secondary side. Then, when the fluid pressures in both of the directions are balanced, no fluid flows.

On the other hand, since the fluid entering from the inlet leaks to the exit through the ga between the partition plate and each of the ports, the pressure exerted on the flow channel or the flow space is released from the exit and, as a result, a load is not exerted on the fluid supply source and the pressure is not increased in the flow channel of the flow space.

DESCRIPTION OF THE ACCOMPANYING DRAWINGS

These and other objects, as well as advantageous features of the present invention will become apparent by reading the following descriptions for the preferred embodiments thereof with reference to the accompanying drawings wherein.

Figure 1:
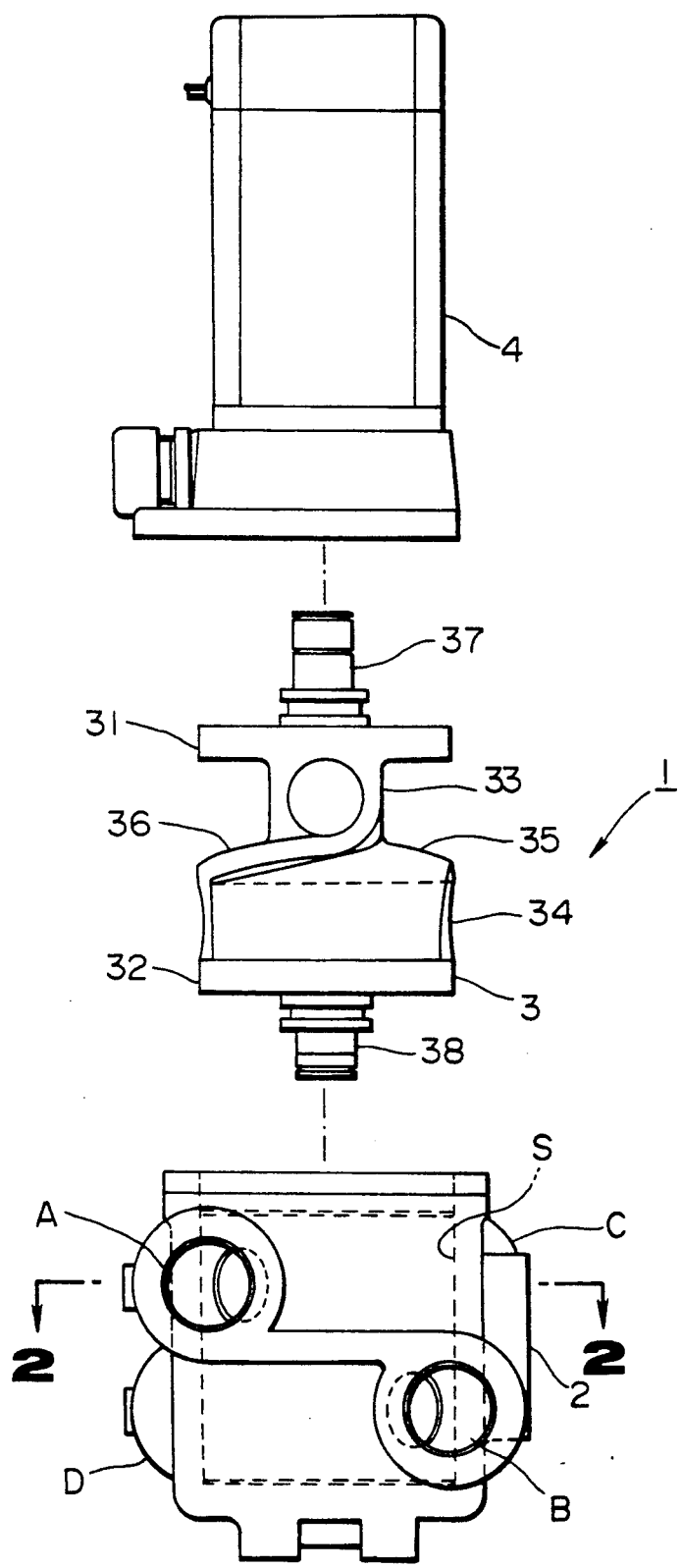
FIG. 1 is an exploded side elevational view illustrating a preferred embodiment of a device for switching the flow direction of a fluid according to the present invention.
Figure 5:
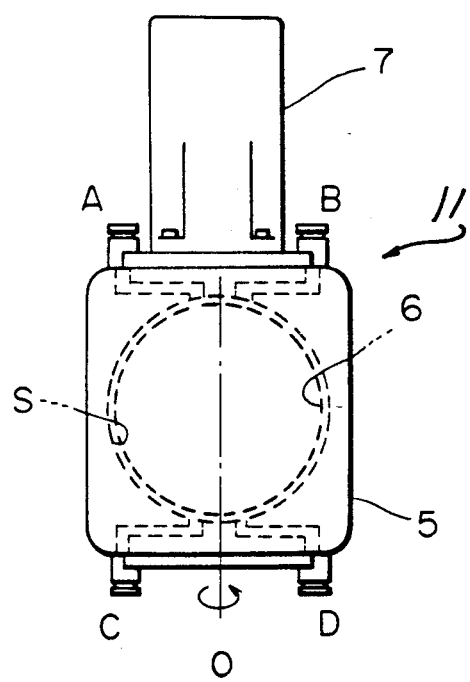
Figure 6:
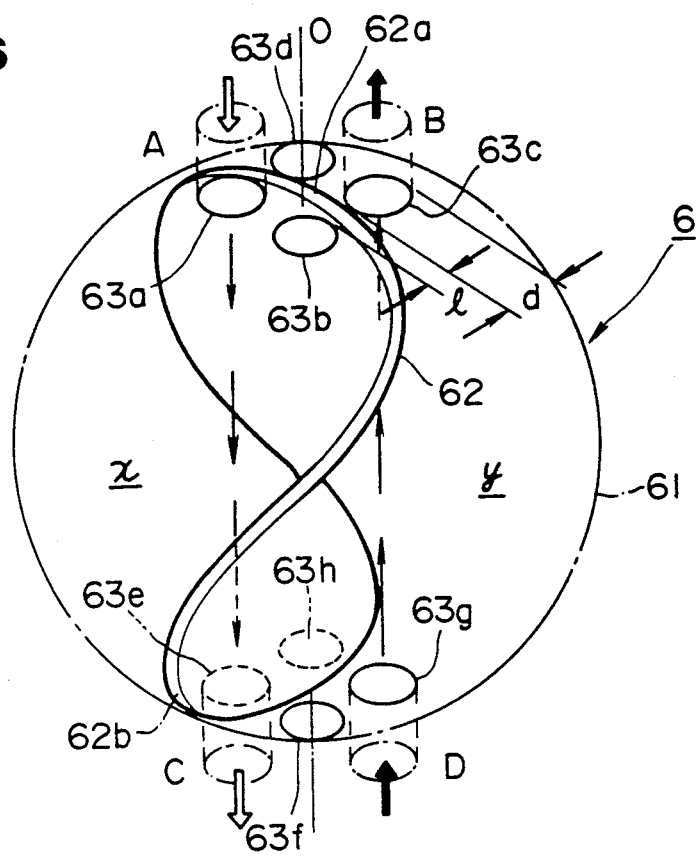
Figure 6:
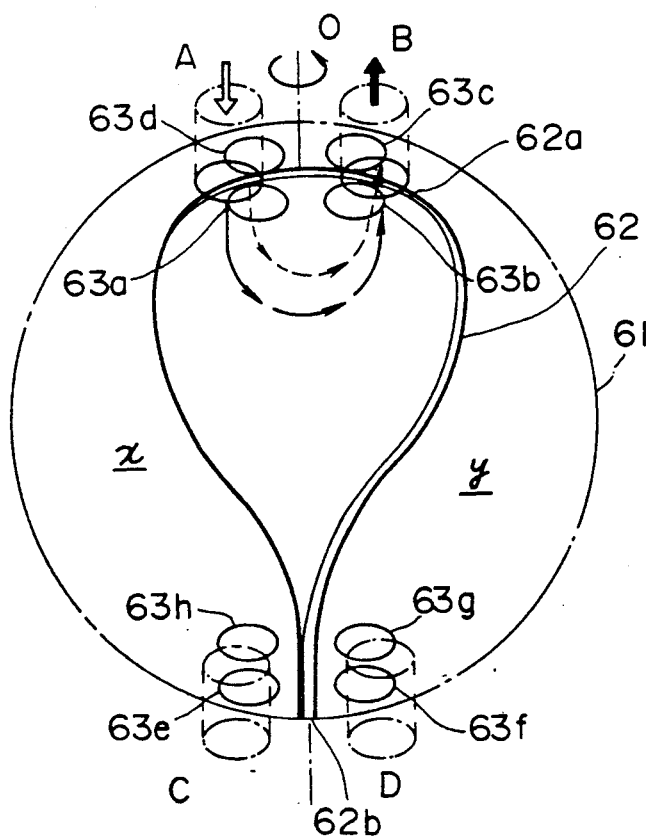
Figure 6:
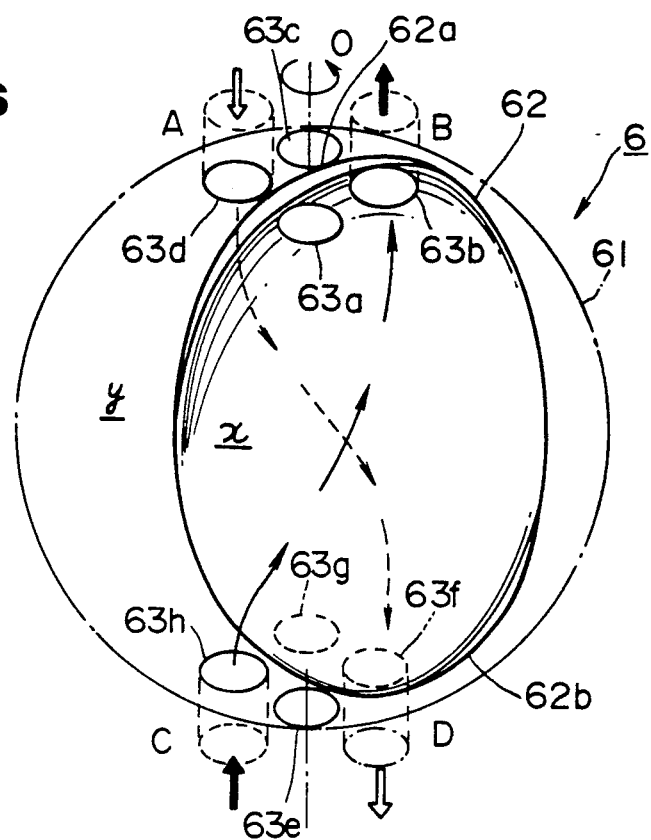
Figure 7:
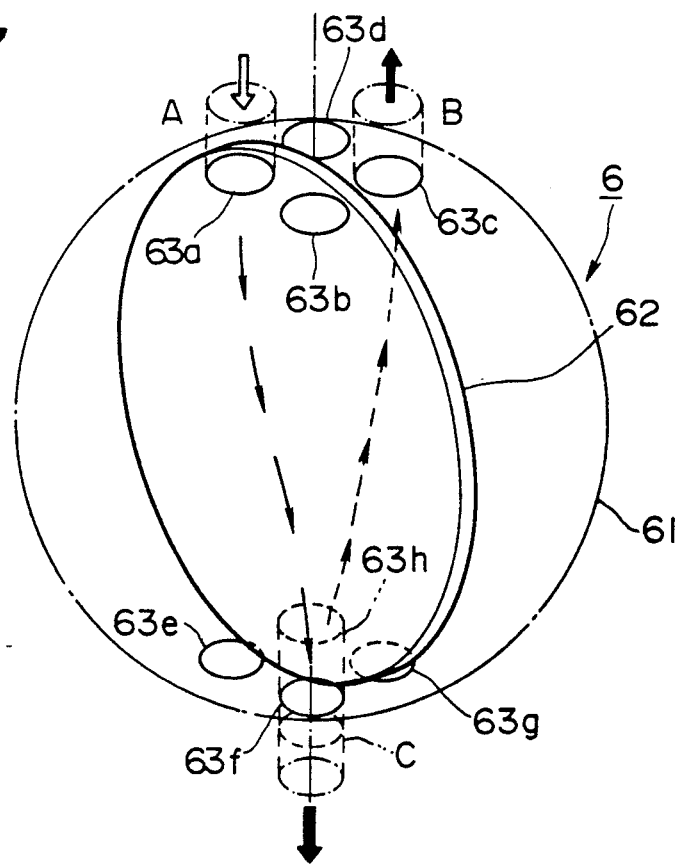

FIGS. 4(a) to 4(d) are explanatory views for depicting the operation of the switching device shown in FIG. 1;

FIG. 5 is a side elevational view illustrating a second embodiment of the device according to the present invention;

FIGS. 6(a) to 6(c) are explanatory views of the operation of the device shown in FIG. 5;

FIG. 7 is an explanatory view illustrating a modified embodiment of the device shown in FIG. 5; and FIGS. 8(a)–8(c) are explanatory views of a prior art directional control valve.

DESCRIPTION OF THE PREFERRED EMBODIMENTS

The present invention will at first be described for the first embodiment with reference to FIGS. 1 through 4. This embodiment concerns a 4-port 3-position device having four channels for switching the flow direction of a fluid.

As shown in FIG. 1, the switching device 1 comprises a main body 2 having a space S at the inside. A selector 3 is fitted in the space S of the main body 2 such that it is rotatable around its rotational shaft. A motor unit 4 is provided for rotating the selector 3 by a predetermined angle.

Figure 2:
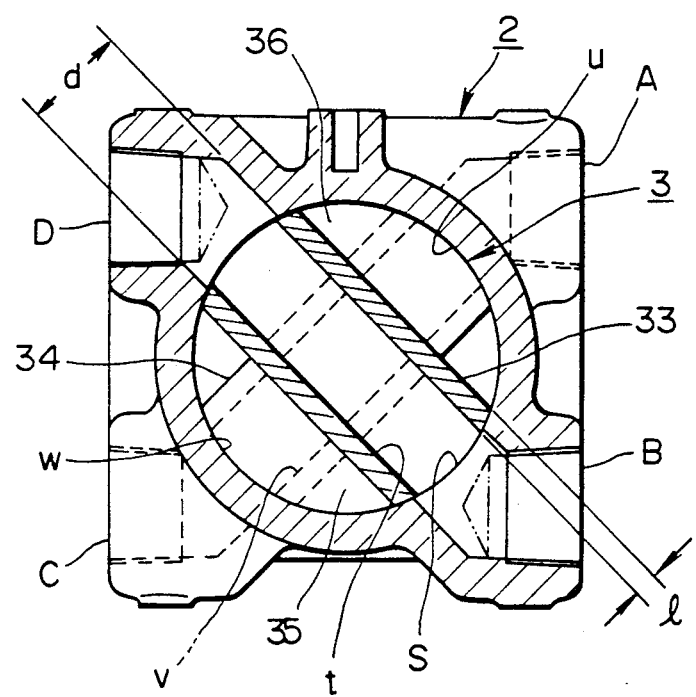
FIG. 2 is a cross sectional view taken along lines 2—2 in FIG. 2 in which a selector is placed in a main body.

The main body 2 is a cylindrical body having in its inside a cylindrical space S that opens at the upper portion thereof. As shown in FIG. 2, an inlet A to be connected with a fluid supply source (not illustrated), an exit B to be connected with a flow destination of a fluid (not illustrated) a first exit/inlet C and a second exit/inlet D to be connected with ends of a flow channel of an apparatus using a fluid (not illustrated) are formed respectively on the circumferential side of the main body 2. Each of the ports A to D is in communication with the space S and are formed at 90° intervals about the main body 2. The inlet A and the first exit/inlet C are disposed in the upper portion, while the exit B and the second exit/inlet D are disposed in the lower portion, respectively, with a step being formed between the upper and lower portions.

Figure 3:
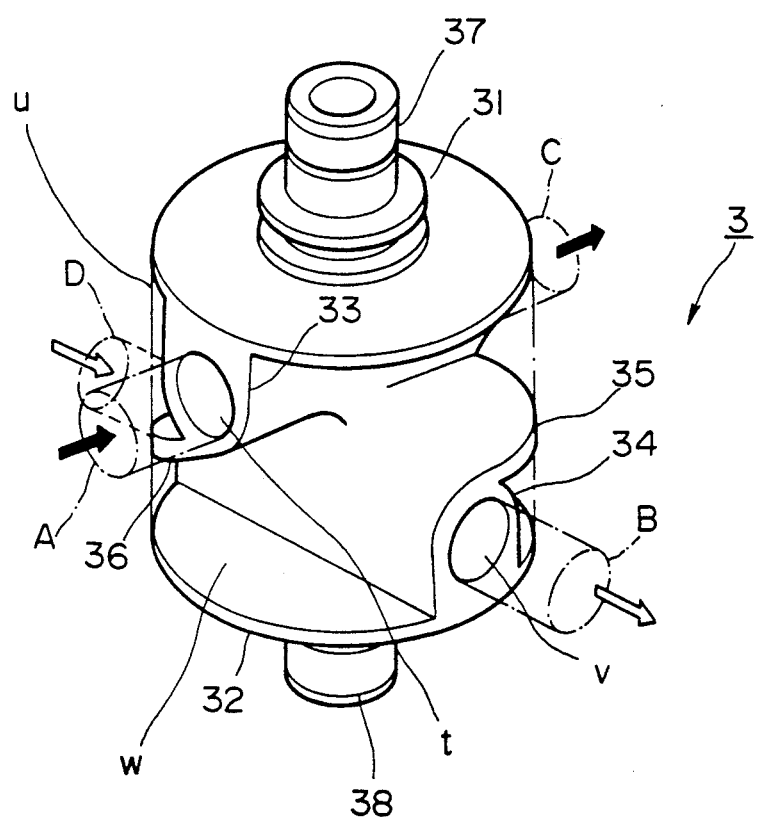
FIG. 3 is a perspective view of the selector.
Figure 4:
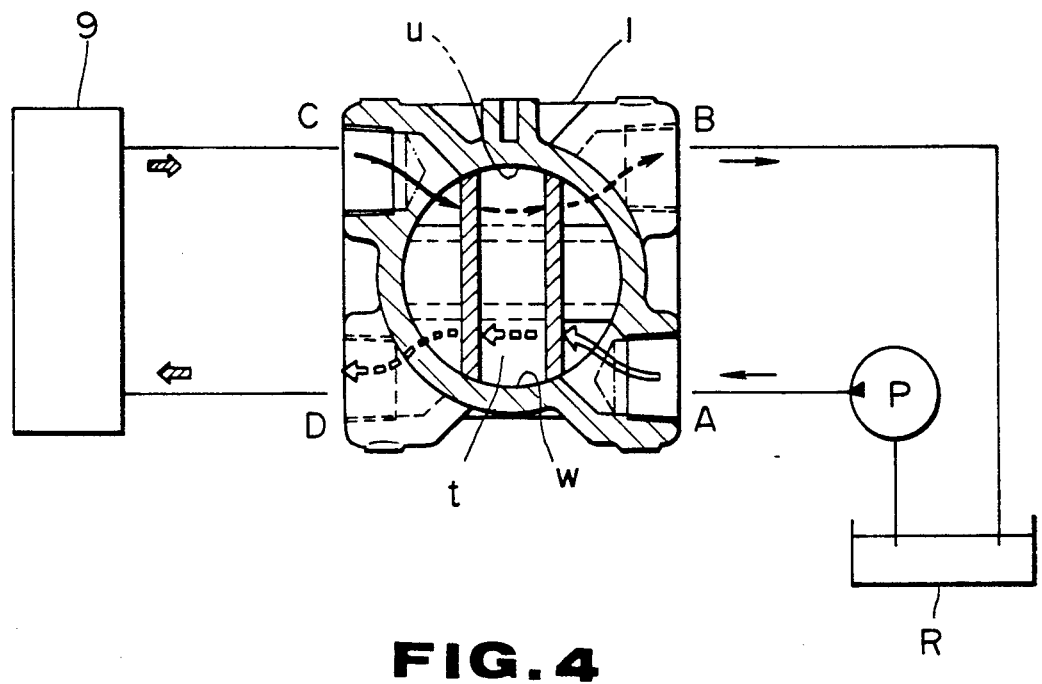
Figure 4:
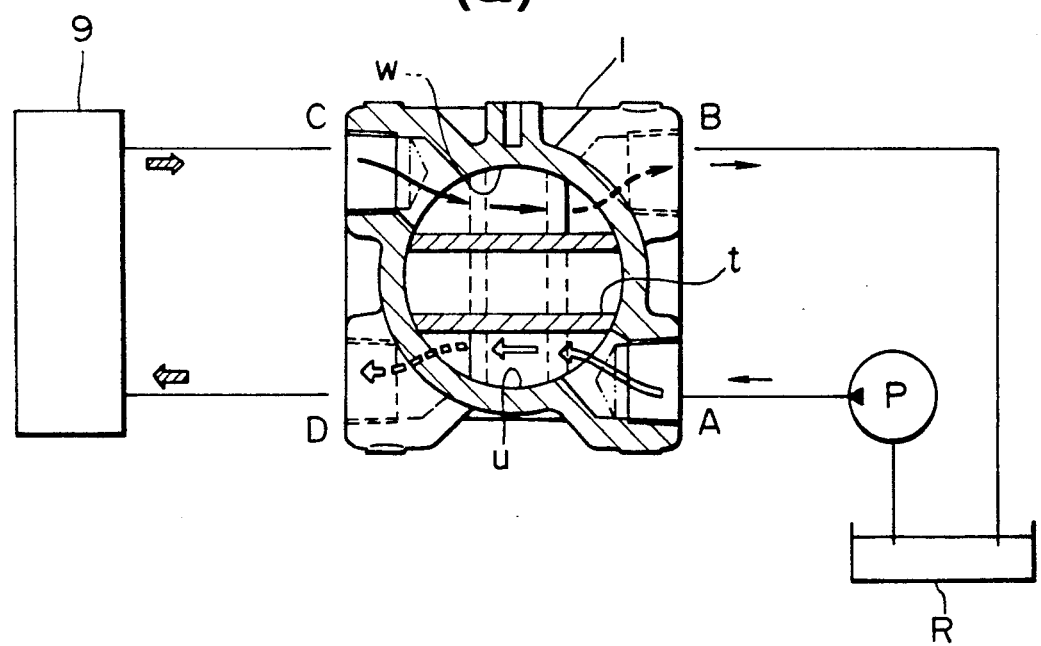

As shown in FIG. 3, the selector 3 comprises an upper disc 31 and a lower disc 32. An upper pipe 33 and a lower pipe 34 are disposed between the upper disc 31 and the lower disc 32, each at a different axial height and disposed perpendicular to each other. Partitions 35 and 36 are formed from the lower end of the upper pipe 33 to the upper end of the lower pipe 34 situated to the right of the upper pipe 33. Shafts 37 and 38 protrude above and below the selector 3. The selector 3 is entirely molded integrally from a synthetic resin or metal.

Accordingly, the selector 3 has a first flow channel t formed in the upper pipe 33, a third flow channel v formed in the lower pipe 34, a second flow channel u formed from above the partition 36 to below the partition 35 and a fourth channel w formed from above the partition 35 to below the partition 36. Each of the pipes 33 and 34 and the partitions 35 and 36 define a partition plate between each of the flow channels t-w and, as shown in FIG. 2, the thickness l is made smaller than the diameter d of the opening for each of the ports A, B, C and D.

In a state where the selector 3 is fitted into the space S of the main body 2, the upper pipe 33 is positioned at a height identical with that of the inlet A and the first exit/inlet C, while the lower pipe 34 is positioned at a height identical with that of the exit B and the second exit/inlet D. In this state, when the inlet A is in communication with the first exit/inlet C by way of the first flow channel t, the exit B is in communication with the second exit/inlet D by way of the third flow channel v. When the inlet A is in communication with the second exit/inlet D by way of the second flow channel u or the fourth flow channel w, the exit B is in communication with the first exit/inlet B by way of the fourth flow channel w or the second flow channel u. Such selective communication for the ports is attained by the rotation of the selector 3 in the space S.

The motor unit 4 is connected to the shaft 37 protruding above the selector 3 and includes a step motor capable of rotating by an optional angle. The switching operation of the selector 3 for controlling the flow direction is conducted by the motor unit 4.

Description will now be made to the operation of this embodiment with reference to FIGS. 4(a)–4(d). FIGS. 4(a)–4(d) show a state in which the switching device 1 according to the present invention is connected at the inlet A with the pump P as a fluid supply source, at the exit B to a reservoir tank R as a flow destination of the fluid and at the first and second exits/inlets C and D to an apparatus or equipment 9 using a fluid, such as a casting die through which cooling water is circulated.

At first, in a state where the inlet A is in communication with the first exit/inlet C by way of the first flow channel t as shown in FIG. 4(a), the third flow channel v which is perpendicular to the first flow channel t communicates the exit B with the second exit/inlet D. In this state, fluid delivered from the pump P is discharged by way of the first flow channel t and from the first exit/inlet C to the secondary side, and the fluid passing through the apparatus 9 is returned from the second exit/inlet D and by way of the third flow channel v to the reservoir tank R on the primary side. Accordingly, the fluid (water) flows in the direction of the arrows through the apparatus 9 on the secondary side (hereinafter referred to as a forward direction). In this case, no fluid flows in the second flow channel u and the fourth flow channel w.

Then, as shown in FIG. 4(b), when the motor unit 4 is actuated to rotate the selector 3 clockwise by about 22°–23° as viewed from above, the inlet A is in communication with the first exit/inlet C and the second exit/inlet D by way of two flow channels, i.e., the first flow channel t and the fourth flow channel w, respectively. In this state, since the first exit/inlet C is in communication with the second exit/inlet D by way of the apparatus 9, fluid pressures are applied from both of the forward and backward directions to the secondary side, and no fluid flows when the fluid pressures are kept in balance between both of the forward and rearward directions. The fluid entering from the inlet A is passed from the first exit/inlet C through the second flow channel u, passed further from the second exit/inlet D by way of the third flow channel v, and then returned to the exit B and further to the reservoir tank R.

Further, as shown in FIG. 4(c), when the selector 3 is rotated clockwise by 45° from the position shown in FIG. 4(a), to connect only the fourth flow channel w with the inlet A, the inlet A is in communication with the second exit/inlet D by way of the fourth channel w, while the exit B is in communication with the first exit/inlet C by way of the second flow channel u. In this state, the fluid delivered from the pump P is discharged by way of the fourth flow channel w and from the second exit/inlet D to the secondary side. The fluid passing through the apparatus 9 is returned from the first exit/inlet C by way of the second flow channel u to the reservoir tank R on the primary side. Accordingly, the fluid flows in the direction of the arrows through the apparatus 9 on the secondary side (hereinafter referred to as a backward direction), which is contrary to the flowing direction shown in FIG. 4(a). No fluid flows in the first flow channel t and the third flow channel v in this case.

Accordingly, since the flow direction is reversed in the equipment 9 by actuating the switching device 1 as shown in FIGS. 4(a) to 4(c), scales deposited in the circulating path of the apparatus 9 can be removed, as well as enabling the apparatus to be cooled or heated uniformly when the fluid is a liquid used for cooling or heating the apparatus 9.

In the above-mentioned example, the selector 3 is rotated clockwise. FIG. 4(d) shows another way of operation in which the selector 3 is rotated counterclockwise by 45°. In this state, since the inlet A is in communication by way of the second flow channel u with the second exit/inlet D and the exit B is in communication by way of the fourth flow channel w with the first exit/inlet C, it can be seen that the flow direction on the secondary side is reversed in the manner similar to that shown in FIG. 4(c).

As has been described above, in the switching device 1 of this embodiment, the flow direction on the secondary side can be switched between the forward and the backward directions by merely rotating the selector 3 without exchanging the inlet A and the exit B for the fluid on the primary side.

Further, in this switching device 1, since the fluid is stopped, when the flow direction is switched between the forward and the backward directions on the secondary side, impact shocks caused by the fluid on the apparatus 9 using the fluid can be moderated.

In particular, in this stationary state, since the fluid leaks between the inlet A and the exit B in this switching device 1, no excess load is exerted on the pump P.

Further, although four flow channels t-w are formed by the selector 3 in this switching device 1, they are disposed such that two flow channels are formed perpendicular to each other and the other two flow channels are disposed, while being twisted, through the gaps between both of the first two flow channels. Accordingly, the structure can be made compact and the size of the device can be reduced.

Description will now be made to a second embodiment of the present invention with reference to FIGS. 5 and 6(a)–6(c).

This embodiment provides a 4-port, 3-position switching device in which two flow spaces are formed in a selector.

As shown in FIG. 5, a switching device 11 comprises a main body 5 having a spherical space S formed in the inside, a spherical selector 6 disposed in the space S and a motor unit 7 for rotating the selector 5 around a rotational shaft O as the center.

The main body 5 has an inlet A for connection with a pump as a fluid supply source (not illustrated), an exit B for connection with a reservoir tank as a flow destination of the fluid (not illustrated), each formed on an upper portion of the main body 5, as well as a first exit/inlet C and a second exit/inlet D for connection with an apparatus using a fluid (not illustrated), each formed in the lower portion of the main body 5. The ports A–D are opened to the space S in the main body 5.

Further, the selector 6 has a spherical, hollow outer shell 61 as show by a dotted chain line in FIG. 6(a), in which four apertures 63a–63d are formed in the upper portion of the outer shell 61 around the rotational shaft O, a 90° interval spacing, while four apertures 63e–63h are formed in the lower portion, each at a position corresponding to one of the apertures 63a–63d in the upper portion. Further, the upper shell 61 has a partition plate 62 disposed inside, which is twisted by 90° around the vertical axis. An upper end portion 62a of the partition plate 62 is disposed such that the apertures 63a and 63d are partitioned from the apertures 63c and 63c, while a lower end portion 62b of the partition plate 62 is disposed such that the apertures 63e and 63h are partitioned from the apertures 63f and 63g. Accordingly, a first flow space x divided by the partition plate 62 includes the apertures 63a and 63d in the upper portion and the apertures 63e and 63h in the lower portion, while the second flow space includes the apertures 63c and 63d in the upper portion and the apertures 63f and 63g in the lower portion. The gap l between each of the apertures 63a–63d is made smaller than the diameter d for each of the ports A-D.

Further, the inlet A and the exit B formed in the main body 5 are made so that they can align with the apertures 63a–63d in the upper portion, while the first exit/inlet C and the second exit/inlet D are made so that they can align with the apertures 63e –63h in the lower portion.

A description will now be made of the operation of this embodiment with reference to FIGS. 6(a)–6(c).

At first, in a state shown in FIG. 6(a), the inlet A is in communication with the aperture 63a, the exit B is in communication with the aperture 63c, the inlet A is in communication by way of the first flow space x with the first exit/inlet C, and the exit B is in communication by way of the second flow space y with the second exit/inlet D. Accordingly, a fluid supplied from the primary side arrives by way of the first flow space x and from the first exit/inlet C at the secondary side and then returns from the second exit/inlet D by way of the second flow space y to the primary side.

Then, as shown in FIG. 6(b), when the motor unit 7 is actuated to rotate the selector 6 counterclockwise by 45° as viewed from above, the inlet A is disposed in communication with the apertures 63a and 63d, while the exit B is in communication with the apertures 63b and 63c. In this state, the inlet A is in communication with both of the first exit/inlet C and the second exit/inlet D. However, since both of the exits/inlets C and D are connected by way of the apparatus using the fluid (not illustrated), no fluid flows on the secondary side when the fluid pressures are kept in balance between both of the flow directions. On the other hand, since the fluid leaks directly between the inlet A and the exit B in the selector 6 by way of the first flow space x and the second flow space y, fluid entering from the inlet A arrives directly at the exit B and is then discharged to the primary side.

Further, as shown in FIG. 6(c), when the selector 6 is rotated counterclockwise by 90° from the state shown in FIG. 6(a), since the distance l between each of the apertures 63a–63d and the apertures 63e–63h is smaller than the diameter d for each of the ports A-D, a state results in which the inlet A is in communication with the aperture 63d, the exit B is in communication with the aperture 63b, the first exit/inlet C is in communication with the aperture 63h, and the second exit/inlet D is in communication with the aperture 63f. That is, the inlet A is in communication by way of the flow space y with the second exit/inlet D, while the exit B is in communication by way of the flow space x with the first exit/inlet C. Accordingly, the fluid supplied from the primary side arrives by way of the flow space y and from the second exit/inlet D at the secondary side, then returns from the first exit/inlet C, by way of the first flow space x to the primary side.

As has been described above, in this switching device 11, the flow direction on the secondary side can be switched between the forward and the backward directions by merely rotating the selector 6, without exchanging the inlet A and the exit B for the fluid on the primary side.

Further, in this switching device 11, since the fluid on the secondary side is stopped upon switching the flow direction, no impact shock caused by the fluid is exerted on the apparatus using the fluid and, since the fluid leaks between the inlet A and the exit B in the switching device 1, exertion of a large load on the pump P can be avoided.

In this embodiment, the first exit/inlet C and the second exit/inlet D are positioned correspondingly to the inlet A and the exit B, respectively. Alternatively, the ports C and D may be displaced 90°, respectively, to the ports A and B as shown in FIG. 7. In this case, the partition plate 62 is not in a twisted shape; but has a flat disc shape.

Further, although the selector 6 is shaped as a spherical body in this embodiment, this is not a particular restriction so long as it is formed as a body of rotation and it can be formed, for example, as a cylindrical body.

As has been described above according to the present invention, since the inlet and the exit on the primary side leak to each other upon switching the flow direction of the fluid, exertion of an excessively large load on the pump can be avoided and a large pressure caused by the inflowing of fluid is not applied to the device, thereby providing a device for switching the flow direction of a fluid which is highly resistant to destruction and also excellent in durability.

What is claimed is:

1. A device for switching the flow direction of a fluid comprising:
  a main body having an inlet to be connected to a fluid supply source and an exit to be connected to a flow destination of the fluid, each disposed on the primary side of the main body, and a first exit/inlet and a second exit/inlet to be connected with an apparatus using the fluid, each disposed on the secondary side of the main body;
  a selector rotatably disposed in the main body around a rotational shaft, the selector including:
  an upper pipe and a lower pipe, the upper pipe and the lower pipe being spaced from each other and disposed perpendicular to each other;
  first and second partitions respectively formed from a lower end of the upper pipe to an upper end of the lower pipe and located to one side of the upper pipe;
  a first flow channel formed by the upper pipe capable of communicating the inlet with the first exit/inlet;
  a second flow channel formed from above the second partition to below the first partition capable of communicating one of the inlet with the second exit/inlet, and the exit with the first exit/inlet;
  a third flow channel formed by the lower pipe capable of communicating the exit with the second exit/inlet; and a fourth flow channel formed from above the first partition to below the second partition capable of communicating one of the exit with the first exit/inlet and the inlet with the second exit/inlet;

the inlet, the exit, the first exit/inlet and the second exit/inlet being disposed at predetermined positions such that communication of one of the first flow channel with the third flow channel and communication o the second flow channel with the fourth flow channel is attained simultaneously with the rotation of the selector; and each of the flow channels being partitioned with a partition plate formed by the upper and lower pipes and the first and second partitions and having a thickness smaller than the diameter of each of the inlet, the exit and the first and second exit/inlet.

2. A device for switching the flow direction of a fluid comprising:

a main body having a spherical space formed therein, an inlet to be connected to a fluid supply source and an exit to be connected to a flow destination of the fluid, each disposed on an upper side of the main body, and a first exit/inlet and a second exit/inlet to be connected with an apparatus using the fluid, each disposed on a lower side of the main body;

a selector rotatably disposed in the spherical spaced of the main body around a rotational shaft;

the selector including a spherical hollow outer shell and a partition plate disposed within the outer shell, the partition plate being twisted by substantially 90° around a vertical axis thereof;

the outer shell having four upper apertures formed in an upper portion thereof around the rotational shaft, each at a 90° interval spacing, and four lower apertures formed in a lower portion respectively opposing the four upper apertures;

an upper edge of the partition plate disposed to partition the four upper apertures into two groups, each containing two of the four upper apertures;

a lower edge of the partition plate disposed to partition the four lower apertures into two groups, each containing two of the four lower apertures;

each of the two groups of upper apertures and each of the two groups of lower apertures being displaced positionally 90° from each other;

a first flow space partitioned by the partition plate to include one group of upper apertures and one group of lower apertures and capable of communicating one of the inlet and the exit with one of the first exit/inlet and the second exit/inlet;

a second flow space partitioned by the partition plate to include the other group of upper apertures and the other group of lower apertures and capable of communicating the other of the inlet and the exit with the other of the first exit/inlet and the second exit/inlet, in which both of the first and second flow spaces are symmetrical to each other with respect to the rotational shaft; and both of the first and second flow spaces being partitioned by the partition plate having a thickness smaller than the diameter for each of the inlet, the exit and the first and second exit/inlet.

* * * * *